D. J. FRANKLIN.
AIR BRAKE MECHANISM.
APPLICATION FILED FEB. 2, 1917.

1,274,156.

Patented July 30, 1918.

Witness
W. E. Boyd.

Inventor
D. J. Franklin

By B. W. Kadel
Attorney

UNITED STATES PATENT OFFICE.

DAVID J. FRANKLIN, OF COLUMBIA, SOUTH CAROLINA.

AIR-BRAKE MECHANISM.

1,274,156.   Specification of Letters Patent.   Patented July 30, 1918.

Application filed February 2, 1917.   Serial No. 146,097.

*To all whom it may concern:*

Be it known that I, DAVID J. FRANKLIN, a citizen of the United States, residing at Columbia, in the county of Richland and State of South Carolina, have invented certain new and useful Improvements in Air-Brake Mechanisms, of which the following is a specification.

This invention relates to air brake mechanisms and the principal object thereof is to provide means for use with locomotive driver brake equipments for preventing an undesired application of the driver brakes. The invention lies in the formation, combination and arrangement of parts as will be herein described and claimed.

Figure 1:
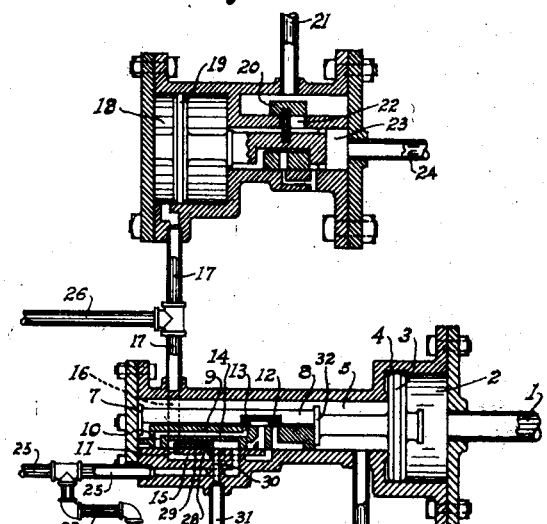
Figure 2:
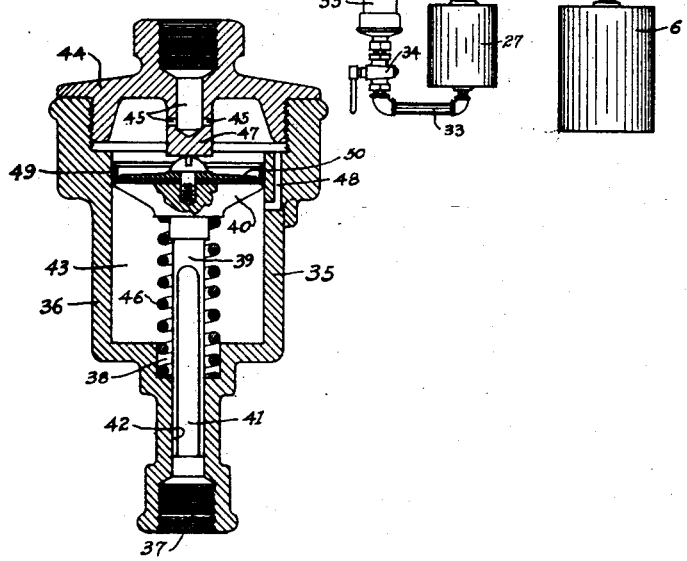

In the drawings, Figure 1 is a simplified diagrammatical representation, largely in section, of a distributing valve in common use on modern locomotives and as manufactured by the Westinghouse Air Brake Company, of Pittsburgh, Pennsylvania, this valve being a portion of the well known Number 6 ET locomotive brake equipment of that company. There is shown in Fig. 1 in connection with this valve and the related parts of the equipment the new features which I employ to obtain better results and to overcome difficulties now experienced in the operation of this equipment. Fig. 2 is a vertical sectional view of the leak-off valve which I employ and which is also shown in diagram in Fig. 1.

The operation of the distributing valve of this equipment is well known to those familiar with the air brake art and its various parts and numerous functions will not be gone into at length herein. In order, however, to fully explain my improvements the following brief description of a portion of its workings is given:

The pipe 1 leads from the train line and admits at all times train line pressure into the chamber 2 on the one side of the piston 3. The parts are shown in release position, when pressure air is fed through the groove 4 around the piston 3 into the cavity 5, and charges the reservoir 6. When a service reduction is made in the train line pipe 1 the piston 3 moves to the right bringing the shoulder 7 of the stem 8 against the valve 9 and then carrying it also to the right until the port 10 thereof registers with the port 11 in the seat. The first movement of the piston 3 shifts the valve 12 to the right and uncovers the port 13, thereby admitting the air from the cavity 5 and the reservoir 6 into the channel 14. Thus when a full service reduction is made the air stored in the reservoir 6 and chamber 5 is admitted into the channel 15 and passes in turn through the communicating passageway 16 and pipe 17 to the chamber 18 where it moves the piston 19 to the right. The movement of the piston 19 moves the valve 20 and admits main reservoir air from the pipe 21, through the port 22 to the driver brake cylinders through the chamber 23 and pipe 24. At the same time the reservoir 27 has also been filled with air from the reservoir 6 to an equalized pressure through the ports 28 and the passages 29 and 30 and the pipe 31.

The pipe 25 leads to the independent brake valve which, for automatic operation is now in "running" position and is through this valve in communication with the automatic brake valve, now in "service" position, where the outlet is blanked off, the action described in the preceding paragraph being for an automatic application of the brakes.

Thus with the parts in release position the chamber 18 and reservoir 27 are open to the exhaust through the communicating ports, etc., and through the pipe 25, independent brake valve and the connected automatic brake valve, both the brake valves being in running position when the automatic brake valve opens this connection to the atmosphere. With the piston 3 and the coöperating parts in service lap position, however, that is, with the valve 9 remaining in its full service position but the piston 3 retreated to the left until the collar 32 of the stem 8 abuts the right hand end of the valve 9, the reservoir 27 and chamber 18 are blanked from the exhaust passage to the independent brake valve. And while the valve 12 has covered the port 13 and thus blanked off communication between the chamber 5 and the chamber 18, there is the possibility of this valve leaking or of the narrow end bridge of the valve 9 leaking adjacent the port 10. Leakage at either place will apply the brakes as the chamber 18 and reservoir 27 are now blanked by the valve 9 from the pipe 25.

It is of common knowledge that one or the other of these valves frequently leaks under these circumstances and the result is that occasionally, when the parts have accidentally shifted into this service lap position by a leaky train line or the jar of the moving locomotive, the locomotive driver brakes will be applied without the knowledge of the engineer, for while the automatic brake valve may be in "running" position and the pipe 25 consequently vented, yet the distributing valve parts have shifted without the knowledge of the engineer into this position where pressure can build up from leakage in the chamber 18.

It is to render such a condition impossible with the parts so connected and the automatic brake valve in running position that the present invention is directed and I shall now describe the new parts I employ and explain their operation in connection with this commercial air brake mechanism.

From the reservoir 27 I lead a pipe 33, this pipe connecting with the pipe 25. In this pipe line I locate a cut-out cock 34 and my leak-off valve 35. This valve 35 is so designed that if a small amount of air is fed into the reservoir 27 when the pipe 25 is open to the atmosphere it will leak off through this valve. But if a considerable volume of air is being admitted, as in service, the valve 35 will be automatically shifted by the built-up pressure, closing the leak-off port and holding the desired pressure until the cavity is exhausted, when the valve parts will again shift into leak-off position.

The cock 34 is provided so that the valve 35 may be cut out of service in case of accident to it or to prevent interfering with other desired operations of the air brake mechanism.

My leak-off valve 35 is constructed as follows:

A casing 36 is provided with an opening 37 in the one end thereof for connection with the pipe 33. This pipe is in fluid communication with the cavity 38 of the valve, the stem 39 of the piston 40 being channeled at 41 to provide fluid passageways through the guide 42. The movable piston 40 fits within the cylindrical cavity 43 and responds in movement to differences in pressure on its opposite sides. The upper end of the casing 36 is closed by the head 44 which is pierced to accommodate the pipe 33 and with air passageways 45 leading to the interior of the cavity and above the piston. It is this end of the valve that is in communication with the reservoir 27, the side opposite the piston being connected to the pipe 25 and therethrough to the atmosphere. A spring 46 extends from beneath the piston 40, surrounding the stem 39 thereof, to the upper end of the guide 42 which serves as an abutment for this spring. The spring normally holds the piston up against the stop 47 on the head 44. As long as but small leakages occur the air will leak off around the piston 40 through the restricted channel 48. But when larger volumes or air are admitted, pressure will build up in the cavity above the piston and overcoming the spring 46 will move the piston to close the lower end of the passageway 48, thus preventing undesired leakage. Upon exhausting the air from the reservoir 27 the piston will return to its normal position through the influence of the spring 46.

The piston 40 is made of a metal disk with an expanding leather packing 49 and a follower 50, this form of piston being most suitable for my form of valve.

Thus the accidental leakage of air into the chamber 27 will not now apply the driver brakes while an intentional application will not be interfered with.

Having thus described my invention, what I now claim is:

1. In an air brake mechanism, a distributing valve arrangement adapted to control the application of locomotive driver brakes and embodying a casing, a movable piston therein, a feed groove around said piston, a reservoir adapted to be charged through said feed groove, a chamber adapted to be charged from said reservoir for effecting movement of the application valve, a valve actuated by the movements of said piston and controlling the admission of air to said chamber, and a leak-off valve connected to said chamber and adapted to allow the escape of air so long as it is admitted in small quantities, and to prevent the escape of air when admitted in larger quantities.

2. In an air brake mechanism, a distributing valve arrangement adapted to control the application of locomotive driver brakes and embodying a casing, a movable piston therein, a feed groove around said piston, a reservoir adapted to be charged through said feed groove, a chamber adapted to be charged from said reservoir for effecting movement of the application valve, a valve actuated by the movements of said piston and controlling the admission of air to said chamber, an independent brake valve, a pipe leading from the said distributing valve to the independent brake valve and being there normally open to the atmosphere, a second valve controlling communication between the said chamber and the pipe leading to the independent brake valve, a second pipe line extending between said chamber and the first said pipe around the said second valve, and a leak-off valve in said second pipe line, adapted to allow the escape of air from the chamber so long as it is admitted in small quantities, and to prevent the escape of air when admitted in larger quantities.

3. In an air brake mechanism, a distributing valve arrangement adapted to control the application of locomotive driver brakes and embodying a casing, a movable piston therein, a feed groove around said piston, a reservoir adapted to be charged through said feed groove, a chamber adapted to be charged from said reservoir for effecting movement of the application valve, a valve actuated by the movements of said piston and controlling the admission of air to said chamber, and a leak-off valve connected to said chamber and adapted to allow the escape of air so long as it is admitted in small quantities, and to prevent the escape of air when admitted in larger quantities, said leak-off valve comprising a casing, an opening at one end thereof for connection with said chamber and an opening at the other end thereof leading to the atmosphere, a movable piston therein forming a closure across the cavity of the valve, a spring adapted to hold the piston in a normal extreme position toward the chamber-end of its cavity, a passageway of restricted area around said piston when the latter is in its normal position, the said piston being adapted to be shifted by the building up of pressure in the chamber to a position where the said passageway will be closed.

In testimony whereof I affix my signature in presence of two witnesses.

DAVID J. FRANKLIN.

Witnesses:
M. NETZKORR,
L. GAAL.

Copies of this patent may be obtained for five cents each, by addressing the "Commissioner of Patents, Washington, D. C."